United States Patent
Abdelrahman et al.

(10) Patent No.: US 10,252,697 B2
(45) Date of Patent: Apr. 9, 2019

(54) SYSTEMS AND METHODS FOR ESTIMATING TORQUE IN A LOCKED VEHICLE SYSTEM

(71) Applicant: FORD GLOBAL TECHNOLOGIES, LLC, Dearborn, MI (US)

(72) Inventors: Emad Abdelrahman, Royal Oak, MI (US); Joshua Guerra, Farmington, MI (US); Lodewijk Wijffels, Canton, MI (US); Oliver Nehls, Nordrhein-Westfalen (DE); Jan Bremkens, Straelen (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 3 days.

(21) Appl. No.: 15/091,647

(22) Filed: Apr. 6, 2016

(65) Prior Publication Data

US 2017/0291577 A1  Oct. 12, 2017

(51) Int. Cl.
| | | |
|---|---|---|
| *B60R 25/0215* | (2013.01) | |
| *B60G 17/005* | (2006.01) | |
| *B60G 17/017* | (2006.01) | |
| *B60G 17/019* | (2006.01) | |
| *B62D 5/00* | (2006.01) | |
| *B62D 3/10* | (2006.01) | |
| *B62D 5/04* | (2006.01) | |

(52) U.S. Cl.
CPC ........ *B60R 25/0215* (2013.01); *B60G 17/005* (2013.01); *B60G 17/017* (2013.01); *B60G 17/019* (2013.01); *B62D 5/008* (2013.01); *B62D 3/10* (2013.01); *B62D 5/0421* (2013.01)

(58) Field of Classification Search
CPC ...... B62D 5/001; B62D 15/025; B62D 9/005; B60W 50/029; B60W 10/06; B60W 10/08; B60W 10/115; B60W 2050/0025; B60W 30/12; B60W 2710/182; B60W 2720/14; B60T 8/363; B60T 2260/02; B60T 2201/08; B60T 2270/402; B60T 8/17557; Y10T 477/23; B60R 16/0232; B60R 25/02144
USPC ............ 701/19, 31.9, 32.9, 41, 70, 99, 102; 192/220.7; 137/596.17; 123/350; 251/129.15; 477/3; 324/765.01; 180/9.4
See application file for complete search history.

(56) References Cited

U.S. PATENT DOCUMENTS

| | | | |
|---|---|---|---|
| 4,947,967 A * | 8/1990 | Kito | ................ B60R 25/02144 192/220.7 |
| 5,230,397 A | 7/1993 | Tranchon | |
| 5,567,023 A * | 10/1996 | Yoo | ........................ B60T 8/364 137/596.17 |
| 7,552,795 B2 | 6/2009 | Sugitani | |
| 8,511,420 B2 | 8/2013 | Kojo et al. | |
| 9,038,760 B1 | 5/2015 | Nehls et al. | |
| (Continued) | | | |

FOREIGN PATENT DOCUMENTS

| | | | | |
|---|---|---|---|---|
| JP | 2008114612 A | 5/2008 | | |
| WO | WO-2004102145 A2 * | 11/2004 | ........... | G01L 3/1478 |

*Primary Examiner* — Abby Y Lin
*Assistant Examiner* — Sanjeev Malhotra
(74) *Attorney, Agent, or Firm* — Jones Robb, PLLC; Raymond Coppiellie

(57) ABSTRACT

A system for estimating torque in a locked vehicle system may include a locking mechanism comprising a stiff material. The system may further include a controller configured to estimate an amount of torque in the locked vehicle system based on a deformation of the stiff material.

11 Claims, 5 Drawing Sheets

(56) References Cited

U.S. PATENT DOCUMENTS

| | | | | |
|---|---|---|---|---|
| 2002/0129788 A1* | 9/2002 | O'Neil | .................. | B60W 10/06 |
| | | | | 123/350 |
| 2004/0172176 A1* | 9/2004 | Kumar | .................. | B60T 8/1705 |
| | | | | 701/19 |
| 2005/0154510 A1* | 7/2005 | Fujioka | .................. | B62D 6/005 |
| | | | | 701/32.9 |
| 2007/0135988 A1* | 6/2007 | Kidston | .............. | B60R 16/0232 |
| | | | | 701/102 |
| 2008/0289897 A1* | 11/2008 | Williams | ............... | B62D 5/001 |
| | | | | 180/402 |
| 2009/0111645 A1* | 4/2009 | Heap | ...................... | B60K 6/445 |
| | | | | 477/5 |
| 2009/0283707 A1* | 11/2009 | Kam | ...................... | B60T 8/363 |
| | | | | 251/129.15 |
| 2010/0151988 A1* | 6/2010 | Tabata | .................. | B60K 6/442 |
| | | | | 477/3 |
| 2011/0022268 A1* | 1/2011 | Kojo | ...................... | B62D 5/008 |
| | | | | 701/41 |
| 2011/0202239 A1* | 8/2011 | Maruyama | ........... | B62D 5/0481 |
| | | | | 701/41 |
| 2012/0185143 A1* | 7/2012 | Ohno | .................... | B60L 3/0061 |
| | | | | 701/99 |
| 2012/0283907 A1* | 11/2012 | Lee | .................... | B60T 8/17557 |
| | | | | 701/31.9 |
| 2013/0253793 A1* | 9/2013 | Lee | .................... | B60W 50/029 |
| | | | | 701/70 |
| 2013/0307577 A1* | 11/2013 | Falkenstein | ............ | G01R 31/34 |
| | | | | 324/765.01 |
| 2015/0239459 A1* | 8/2015 | Pettersson | .............. | B60K 6/365 |
| | | | | 477/3 |
| 2016/0107709 A1* | 4/2016 | Hellholm | ................. | B60D 5/00 |
| | | | | 180/9.4 |

\* cited by examiner

SYSTEMS AND METHODS FOR ESTIMATING TORQUE IN A LOCKED VEHICLE SYSTEM

TECHNICAL FIELD

The present disclosure relates generally to systems and methods for estimating torque in a locked vehicle system. In particular, the present disclosure relates to systems and methods for estimating the amount of torque in an adaptive steering system of a motor vehicle, when the system is locked.

BACKGROUND

Motor vehicles may provide steering assistance to amplify a force or torque applied by a driver of the vehicle (i.e., at a steering wheel) to the steering assembly of the vehicle. Vehicles, for example, generally have either electric power assisted steering (EPAS) or hydraulic power steering. Vehicles with power steering systems may also be equipped with adaptive steering systems, such as, for example, adaptive front steering (AFS) systems. Adaptive steering systems may, for example, continuously and intelligently alter the relationship between a driver's steering inputs at the steering wheel and the angle of the steered road wheels of the vehicle. An adaptive steering system, for example, varies the degree that the road wheels turn in response to rotation of the steering wheel via a mechatronic auxiliary system (e.g., including an AFS motor).

Adaptive steering systems may, therefore, be used to adjust a rotation angle in the steering assembly in response to a vehicle's operating conditions. For example, an adaptive steering controller may receive data regarding the vehicle's operating conditions and adjust the angle applied by the driver (i.e., the angle provided by the driver at the steering wheel). This adjustment is generally referred to as an overlay angle, and represents the difference between the angle at the steering wheel (i.e., the driver input angle) and the angle of the steered road wheels (i.e., the angle of the rod coupled to the wheels). In this manner, when the AFS system is operational and the AFS motor is powered, the AFS system may estimate the external torque that is applied to the system based on the amount of torque that is needed to generate the desired overlay angle (i.e., the torque applied by the AFS motor).

High torque events (i.e., events producing external torques outside the normal range of torques typically applied by a driver), such as, for example, caused by potholes, during steering catch, or due to reduced steering assist can, however, damage an AFS system. Accordingly, to mitigate damage, AFS systems are often configured to detect high torque events and mechanically lock the AFS motor. However, once the AFS system is locked (and the motor is depowered), the system loses its ability to estimate the external torque, which in turn prevents the system from accurately determining when to unlock once the high torque event is over.

It may, therefore, be advantageous to provide systems and methods that may estimate the amount of torque in an AFS system when the system is locked.

SUMMARY

In accordance with various exemplary embodiments of the present disclosure, a system for estimating torque in a locked vehicle system may include a locking mechanism comprising a stiff material. The system may also include a controller configured to estimate an amount of torque in the locked vehicle system based on a deformation of the stiff material.

In accordance with various additional embodiments of the present disclosure, a system for estimating torque in a locked adaptive steering system may include a locking mechanism comprising a solenoid surrounded by a stiff material. The locking mechanism may be configured to transition the adaptive steering system between an unlocked state and a locked state. The system may also include a motor angle sensor configured to measure a rotational displacement of an adaptive steering system motor, while the adaptive steering system is in the locked state. The system may further include a controller communicatively coupled to the motor angle sensor. The controller may be configured to calculate a deformation of the stiff material based on the measured rotational displacement and estimate an amount of torque in the adaptive steering system, while the adaptive steering system is in the locked state, based on the deformation.

In accordance with various further embodiments of the present disclosure, a method for estimating torque in a locked vehicle system may include, while a vehicle system is in a locked state, calculating a deformation of a component within a locking mechanism based on a displacement of a component within the vehicle system. The method may also include estimating an amount of torque in the vehicle system based on the deformation.

Additional objects and advantages of the present disclosure will be set forth in part in the description which follows, and in part will be obvious from the description, or may be learned by practice of the present disclosure. Various objects and advantages of the present disclosure will be realized and attained by means of the elements and combinations particularly pointed out in the appended claims.

It is to be understood that both the foregoing general description and the following detailed description are exemplary and explanatory only and are not restrictive of the present disclosure.

The accompanying drawings, which are incorporated in and constitute a part of this specification, illustrate embodiments of the present disclosure and together with the description, serve to explain the principles of the present disclosure.

BRIEF DESCRIPTION OF THE DRAWINGS

At least some features and advantages of the present disclosure will be apparent from the following detailed description of exemplary embodiments consistent therewith, which description should be considered with reference to the accompanying drawings, wherein.

Although the following detailed description makes reference to exemplary embodiments, many alternatives, modifications, and variations thereof will be apparent to those skilled in the art. Accordingly, it is intended that the claimed subject matter be viewed broadly.

DESCRIPTION OF EXEMPLARY EMBODIMENTS

Reference will now be made in detail to various embodiments, examples of which are illustrated in the accompanying drawings. However, these various exemplary embodiments are not intended to limit the disclosure. To the contrary, the disclosure is intended to cover alternatives, modifications, and equivalents.

High torque events (i.e., events producing external torques outside the normal range of torques typically applied by a driver) can damage a vehicle's adaptive front steering (AFS) system. Accordingly, AFS systems have been developed that can detect a high torque event and mechanically lock the AFS motor to prevent damage to the system during the event. One exemplary system that may be used to lock an AFS system is disclosed, for example, in U.S. Pat. No. 9,038,760 B1, to Nehls et al. (filed Nov. 12, 2013; issued May 26, 2015), the entire content of which is incorporated by reference herein. Once the system is locked, however, the AFS system generally loses its ability to estimate the external torque, which in turn prevents the system from accurately determining when to unlock once the high torque event is over. The systems and methods of the present disclosure may be used to estimate the external torque in a vehicle system, such as, for example, an AFS system when the system is locked.

The systems and methods of the present disclosure contemplate, for example, estimating an amount of external torque in the locked system based on a deformation of a component within the system's locking mechanism. In various embodiments, for example, a controller may be configured to calculate a deformation of a stiff material, such as, for example, a bushing that surrounds a solenoid in the locking mechanism based on a displacement of a component within the locked system. For instance, when implemented in a locked AFS system, a controller may be configured to calculate the deformation of a bushing based on a rotational angle of an AFS motor. In this manner, as will be explained further below, the systems and methods of the present disclosure may utilize existing sensors, such as, for example, an AFS motor angle sensor to estimate the amount of external torque in the system, and send a request to unlock the AFS system if, for example, the estimated torque is less than a threshold torque (i.e., indicating that the high torque event is over).

Figure 1:
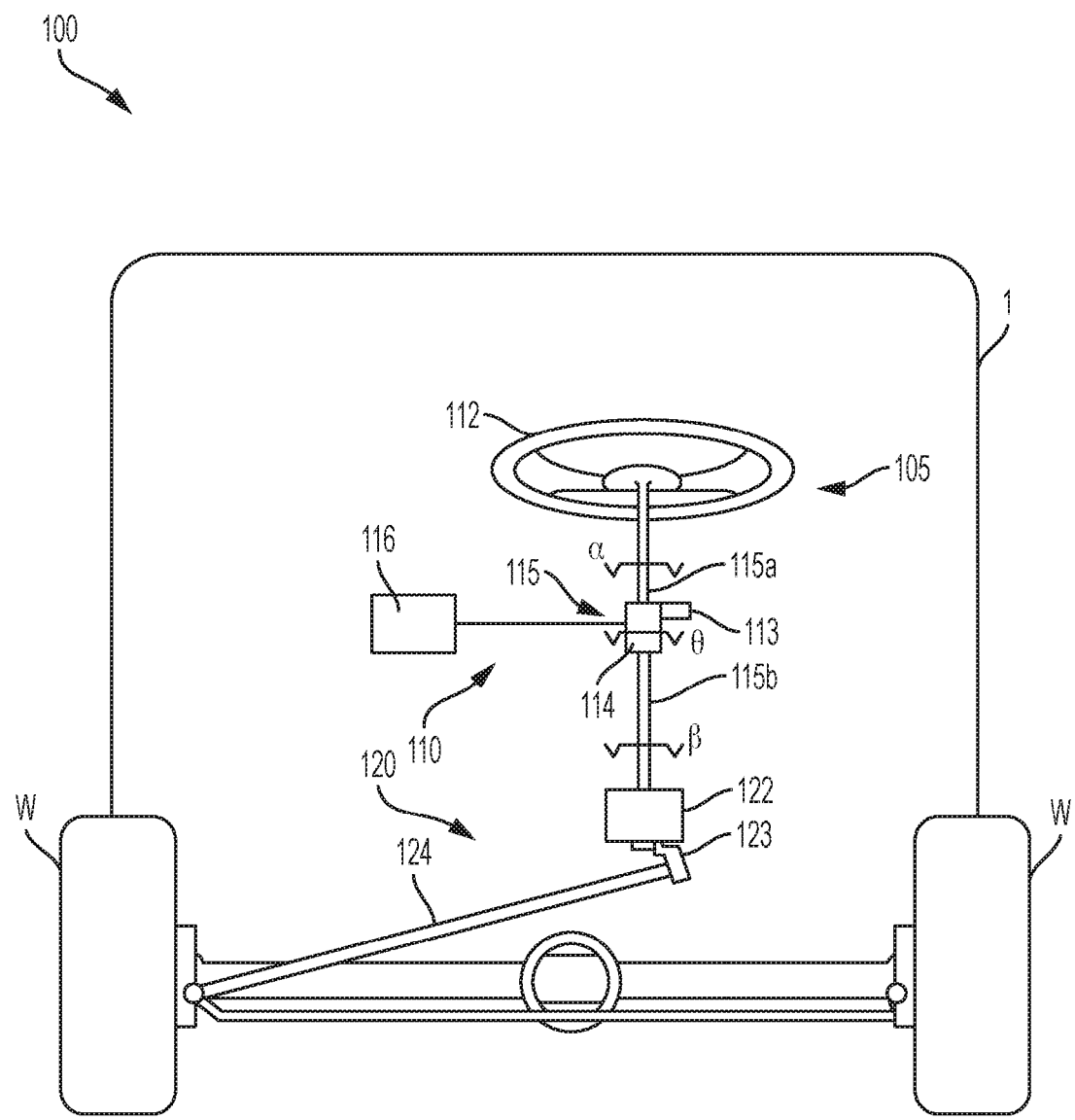
FIG. 1 illustrates the structure of an exemplary embodiment of a system for estimating torque in a locked adaptive front steering (AFS) system of a motor vehicle in accordance with the present disclosure.

Turning now to the drawings, FIG. 1 shows the structure of an exemplary embodiment of a system 100 for estimating torque in a locked system of a motor vehicle 1. The motor vehicle 1 is equipped with an adaptive steering system, such as, for example, an adaptive front steering (AFS) system 110 and a hydraulic power steering system 120.

The vehicle 1 includes a steering assembly 105. The steering assembly 105 includes a steering wheel 112 and an adaptive steering motor 114 (AFS motor) coupled to first and second portions 115a, 115b of a steering column 115. The adaptive steering motor 114 is communicatively coupled to a controller, such as, for example, an adaptive steering controller 16 (which is also communicatively coupled to a motor angle sensor 113) to form the AFS system 110 of the vehicle 1.

The steering column 115 is also coupled to the hydraulic power steering system 120. The system 120 includes, for example, a gear box 122 coupled via an arm 123 to a rod 124. The gear box 122 receives hydraulic fluid (i.e., power steering fluid) from a power steering pump (not shown), which is turned by the vehicle's engine (not shown). The power steering fluid provides hydraulic assistance to an external torque applied to the steering wheel 112, for example, by a driver of the vehicle 1 (e.g., to help push the rod 124 as the driver turns the steering wheel 112).

In accordance with various exemplary embodiments, the AFS system 110 of the steering assembly 105 is configured to react to vehicle operating parameters by adding an overlay angle $\theta$ to a steering angle $\alpha$ applied by the driver at the steering wheel 112. For example, the driver can supply a torque (an external torque) to turn the steering wheel 112 to a first angle $\alpha$ to change a steering angle of the vehicle's wheels W. The adaptive steering controller 116 may sense one or more vehicle operating parameters and adjust the angle of the wheels W by applying an overlay angle $\theta$ to the steering column 115. In other words, a second angle $\beta$ of the steering column 115 (the angle which is applied to the wheels W) equals the first angle $\alpha$ plus the overlay angle $\theta$ (which is applied by the adaptive steering motor 114).

In this manner, when the AFS system 110 is operational and the AFS motor 114 is powered, the AFS system 110 may estimate the external torque that is applied to the system 110 based on the amount of torque that is needed to generate the desired overlay angle $\theta$ (i.e., the torque applied by the AFS motor 114). As above, however, high torque events, which produce external torques outside the normal range of torques typically applied by the driver, can damage the AFS system 110. Thus, to mitigate the damage during such events, the AFS system 110 may also be configured to detect high torque events and mechanically lock the adaptive steering motor 114 during such events.

Figure 2:
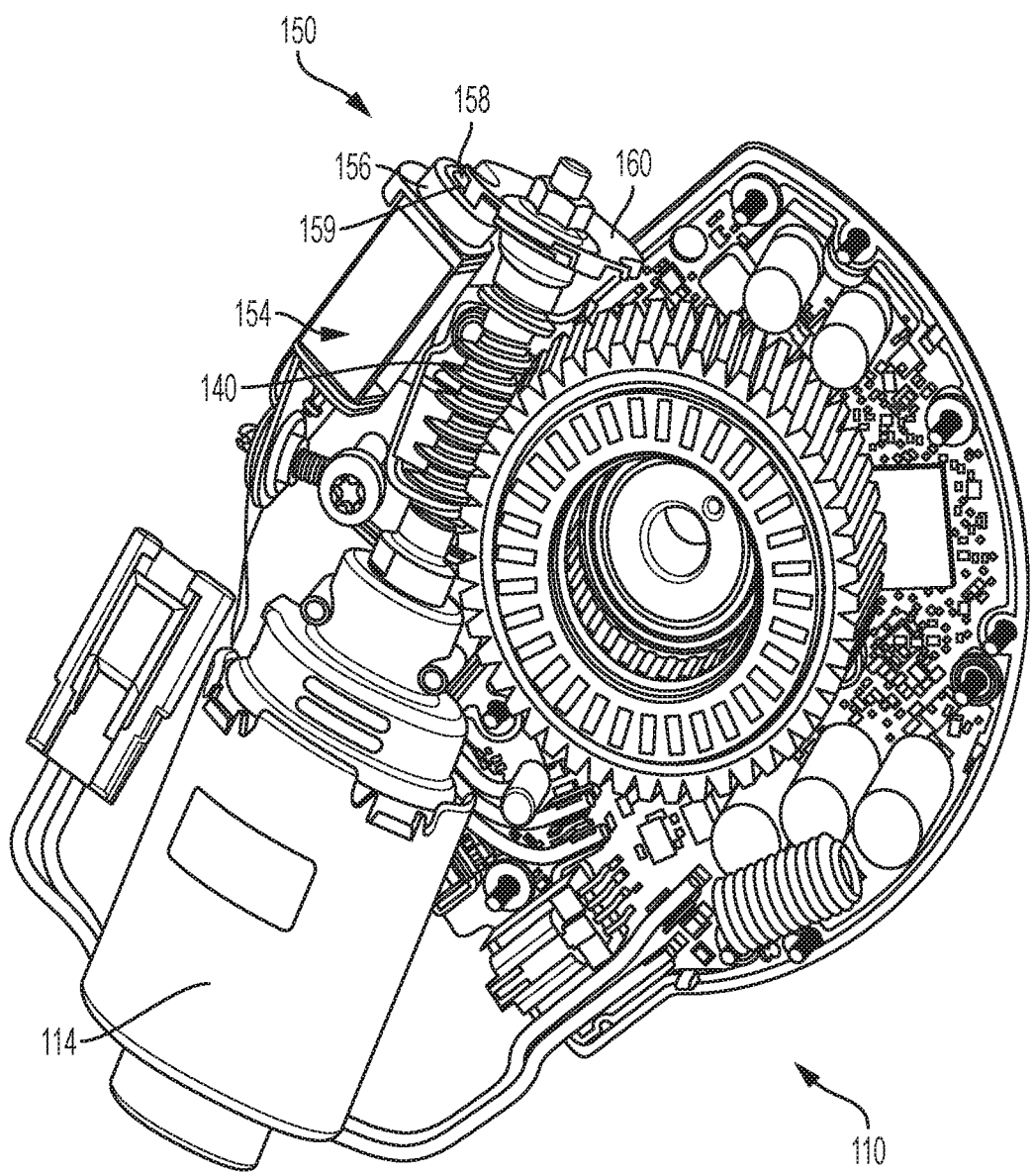
FIG. 2 is an enlarged perspective view of the AFS system of FIG. 1, showing the AFS system in a locked state.
Figure 3A:
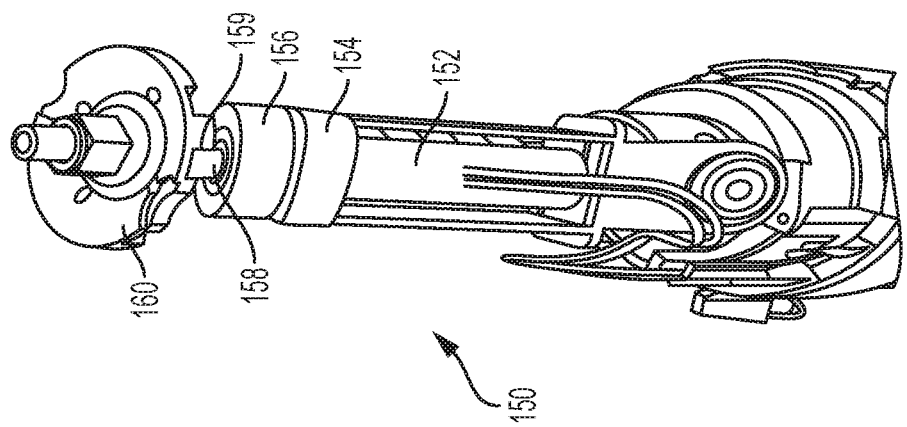
FIG. 3A is a perspective view of a locking mechanism of the AFS system of FIG. 1, with the AFS system in the locked state.
Figure 3B:
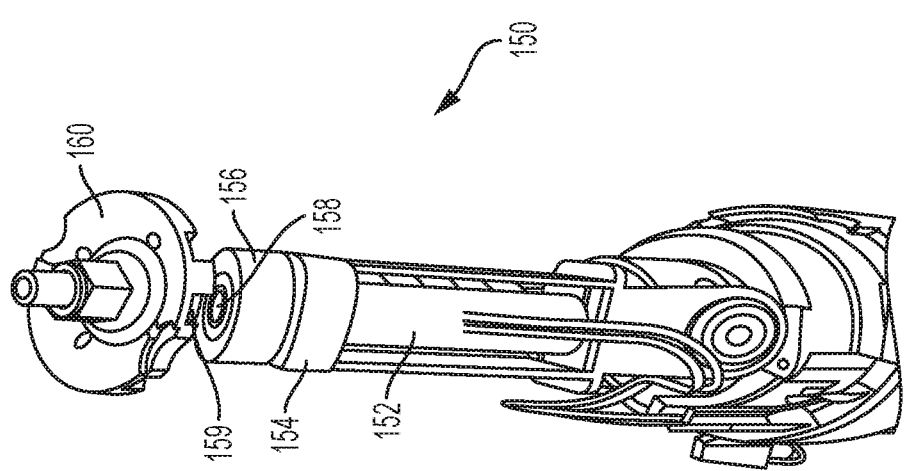
FIG. 3B is a perspective view of the locking mechanism of the AFS system of FIG. 1, with the AFS system in an unlocked state.
Figure 4:
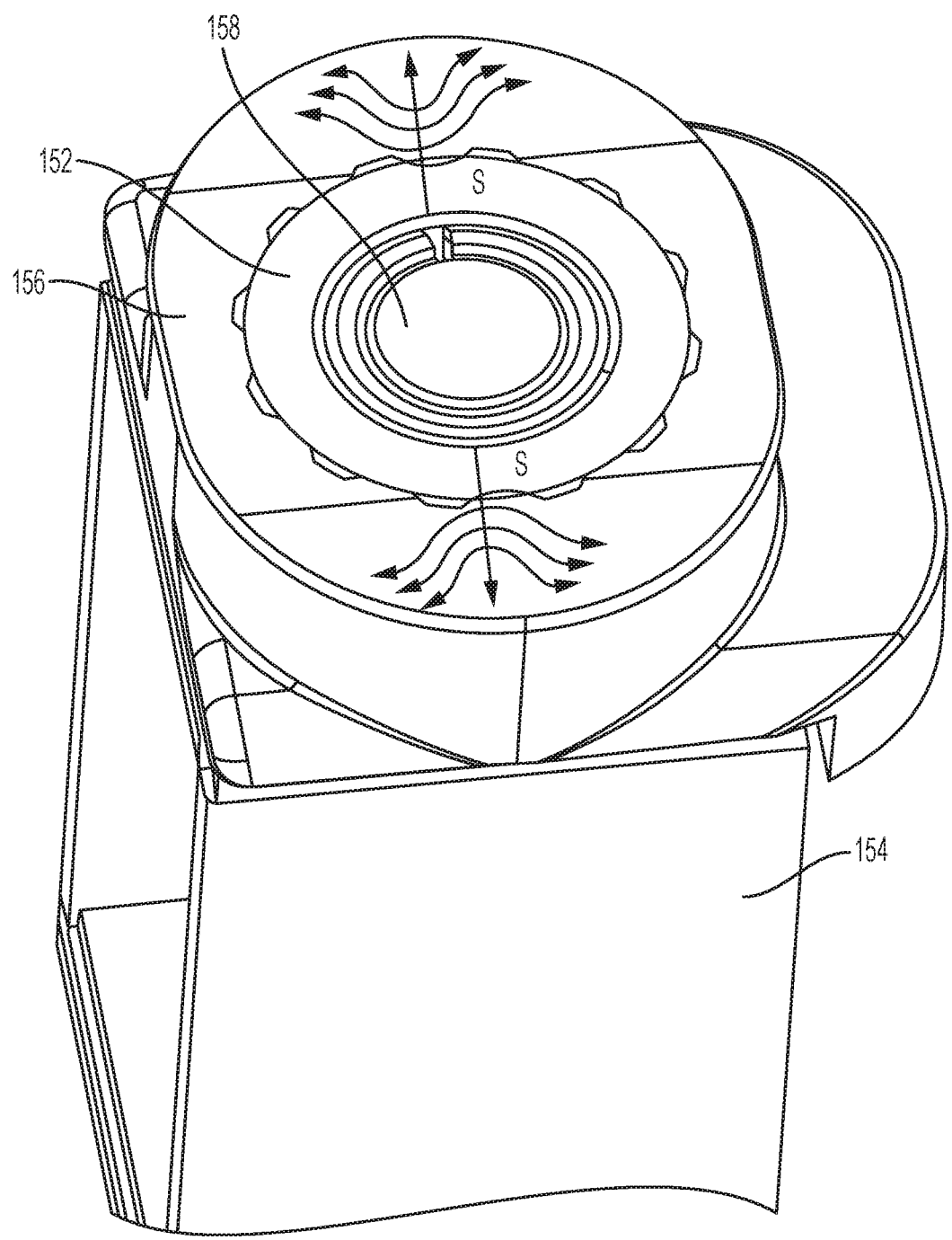
FIG. 4 is a partial, top perspective view of the locking mechanism of the AFS system of FIG. 1.

As illustrated in FIGS. 2-4, in various exemplary embodiments, the AFS system 110 may include a locking mechanism 150 that is configured to mechanically lock the adaptive steering motor 114 during high torque events. In accordance with various exemplary embodiments, the locking mechanism 150 includes a solenoid 152 (e.g., that is located within and fixed to a housing 154), a locking pin 158 positioned within the solenoid 152, and a locking disk 160 positioned over the locking pin 158. As shown best perhaps in FIG. 2, the locking disk 160 is coupled to a shaft 140 of the adaptive steering motor 114, and is positioned over the locking pin 158 such that a pocket 159 in the locking disk 160 is aligned with the locking pin 158. In this manner, the AFS system 110 may lock the AFS motor 114 (e.g., upon detection of a high torque event), by activating the locking pin 158 (e.g., via the solenoid 152), to extend the locking pin 158 outwardly from the solenoid 152 and into the pocket 159 in the locking disk 160, thereby preventing the locking disk 160 and in turn the AFS motor 114 from rotating. Thus, in accordance with various embodiments, as shown in FIGS. 3A and 3B, the locking mechanism 150 is configured to transition the AFS system 110 between an unlocked state (see FIG. 3A) and a locked state (see FIG. 3B) by respectively extending and retracting the locking pin 158 into and out of the pocket 159 in the locking disk 160.

As used herein the terms "unlocked state" and "locked state" respectively refer to states of a vehicle system in which a motor and/or actuator of the system is unlocked and powered and locked and depowered. In other words, with reference to an AFS system, such as, for example the above system 110, the unlocked state refers to the state in which the adaptive steering motor 114 is allowed to freely provide an overlay angle θ to a steering angle α applied by the driver. And, the locked state refers to the state in which the adaptive steering motor 114 is locked and prevented from applying an overlay angle θ.

However, when the AFS system 110 is locked (i.e., is in the locked state), and the AFS motor 114 is prevented from actively applying an overlay angle θ, the AFS system 110 can no longer estimate the external torque that is applied to the system 110 based on the amount of torque that is needed to generate the desired overlay angle θ. Therefore, without another means of estimating the amount of external torque in the system 110, the AFS system 110 may not recognize when a high torque event is over so that the system 110 can be safely unlocked.

The systems and methods in accordance with the present disclosure may, however, estimate the amount of torque in the AFS system when the system is locked based, for example, on a deformation within the locking mechanism that is caused by the external torque. This estimated torque can then be compared with a threshold torque to determine whether or not it is safe to unlock the AFS system. For example, as explained further below, a system 100 for estimating torque in a locked AFS system 110 may include a locking mechanism, such as, for example, the locking mechanism 150, which includes a stiff material, wherein a deformation of the stiff material is used to estimate the amount of torque in the locked system 110.

In various embodiments, for example, the locking mechanism 150 may include a solenoid 152 that is surrounded by a rubber material, such as, for example a rubber bushing 156 that is compressed when an external torque is applied to the locked AFS system 110. As above, the solenoid 152 is fixed to the housing 154. Accordingly, when an external torque is applied to the locked AFS system 110 via, for example, the steering column 115, the locking disk 160 will rotate, which will apply a force on the locking pin 158, which in turn will apply a force on the solenoid 152 that will deform the surrounding bushing 156. As illustrated in FIG. 4, for example, when a force is applied by the pin 158, the solenoid 152 will move along the lines S to compress the bushing 156. This compression may then be used to estimate the amount of external torque that was applied to the system 110.

Those of ordinary skill in the art would understand that the above locking mechanism 150 is exemplary only, and that various other types and/or configurations of locking mechanisms, including various types, shapes, and/or configurations of stiff materials, may be used to estimate the external torque, without departing from the scope of the present disclosure and claims.

In accordance with various exemplary embodiments of the present disclosure, the deformation (i.e., compression) of the bushing 156 may be calculated based on a measured displacement within the locked AFS system 110. For example, as explained further below, the system 100 may also include a sensor and a controller communicatively coupled to the sensor, wherein the sensor is configured to measure the displacement and relay the measured displacement to the controller. The controller is then configured to calculate the deformation of the bushing based on the sensed displacement and estimate the external torque based on the deformation. For example, when an external torque is applied to the locked AFS system 110 via, for example, the steering column 115, the applied force will also slightly rotate (e.g., up to a couple of degrees) the adaptive steering motor 114 (which is coupled to the steering column 15 via the shaft 140). Thus, the compression of the bushing 156 may be calculated based on a measured rotational displacement of the motor 114. In various exemplary embodiments, the system 100 may, therefore, utilize the motor angle sensor 113 to measure a rotational angle of the adaptive steering motor 114 and relay the measured rotational angle to the adaptive steering controller 116. The adaptive steering controller 116 may then calculate the compression of the bushing 156 based on the measured rotational angle and estimate the external torque based on the deformation.

Because most existing vehicles already contain a motor angle sensor associated with the AFS system, certain exemplary embodiments of the present disclosure contemplate using only existing vehicle sensors. Exemplary embodiments of the present disclosure also contemplate systems and methods that include and utilize additional sensors as needed to provide the signal inputs and data used in the systems and methods of the present disclosure. Furthermore, it would be understood that the measured displacement can be measured, determined, and/or calculated using any known methods and/or techniques using various types and/ or combinations of sensors. Furthermore, the controller (i.e., calculating the deformation based on the displacement and estimating the external torque) may instead include, various other existing vehicle controllers such as, for example, the Electronic Control Unit (ECU) of the vehicle 1, or a dedicated controller, or control may be distributed among more than one vehicle controller, as would be understood by one ordinarily skilled in the art.

Figure 5:
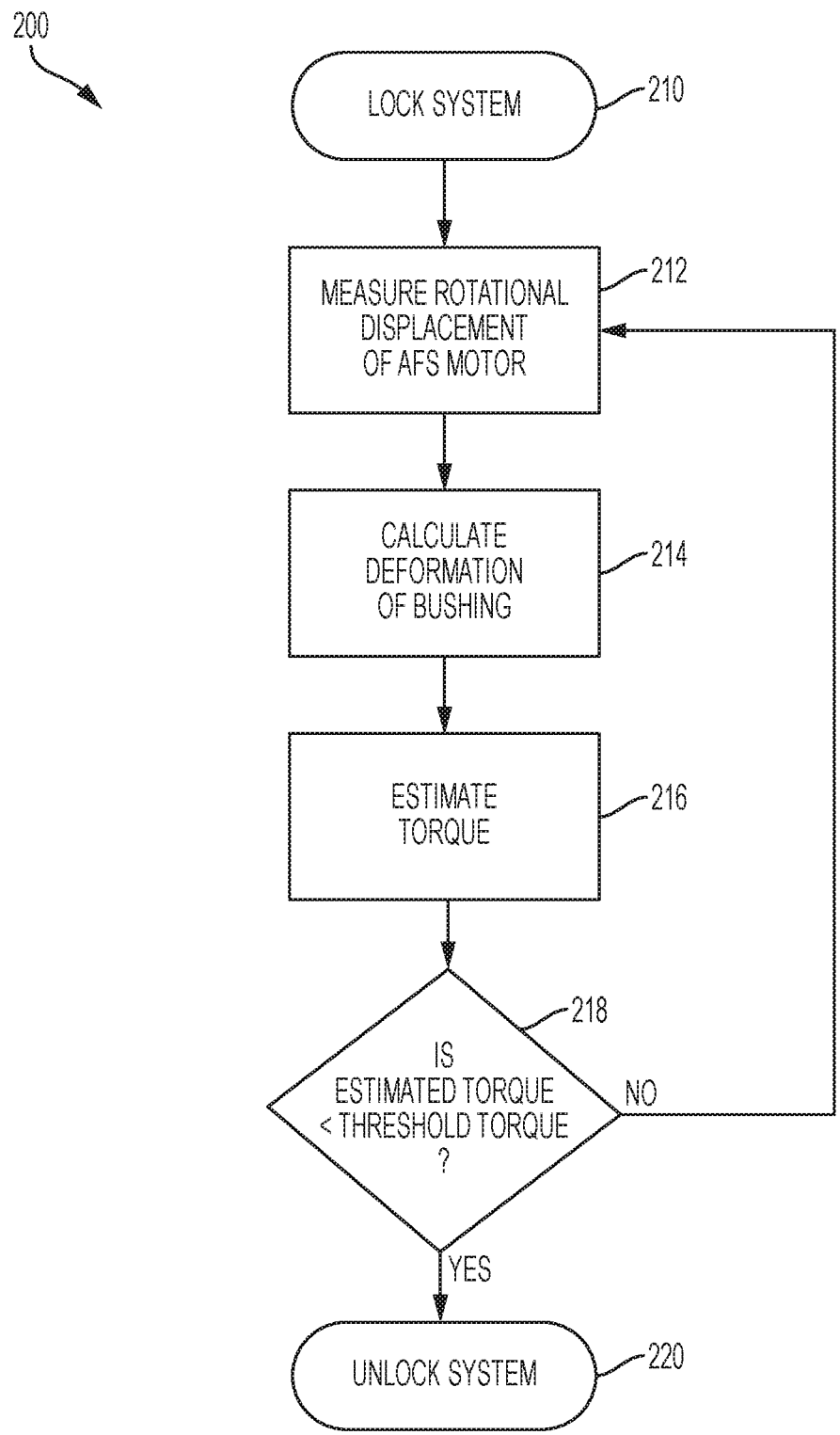
FIG. 5 shows a flow chart illustrating an exemplary embodiment of a method for estimating torque in a locked AFS system in accordance with the present disclosure.

FIG. 5 shows a flow chart illustrating an exemplary embodiment of a method 200 for estimating torque in a locked vehicle system, such as, for example, a locked AFS system 110, in accordance with the present disclosure, which is explained with reference to the system 100 of FIG. 1-4. At step 210, a vehicle controller, such as, for example, the adaptive steering controller 116 may lock the AFS system 110, for example, after sensing that the system 110 is experiencing a high torque event. As above, in accordance with various embodiments, the steering controller 116 may transition the AFS system 110 from an unlocked state to a locked state via a locking mechanism 150. As above, the locking mechanism 150 includes a solenoid 152, a locking pin 158 positioned within the solenoid 152, and a locking disk 160 positioned over the locking pin 158. For example, the locking disk 160 is coupled to a shaft 140 of the adaptive steering motor 114 (AFS motor), and is positioned over the locking pin 158 such that a pocket 159 in the locking disk 160 is aligned with the locking pin 158. Thus, the steering controller 116 may transition the AFS system 110 from an unlocked state to a locked state by activating the locking pin 158, via the solenoid 152, to engage the pocket 159 of the locking disk 160, thereby preventing the locking disk 160 and in turn the motor 114 from rotating.

However, any external torque that is applied to the locked AFS system 110 via, for example, the steering column 115, may still rotate the locking disk and motor 114 by a couple of degrees, depending on how much torque is being applied, and be relayed through the locking pin 158 to the solenoid 152 to ultimately deform the bushing 156 surrounding the solenoid 152. In other words, the more the motor rotates, the more the bushing compresses. Thus, as above, the displacement of the motor 114 may be used to calculate the deformation of the bushing 156 and the deformation may be used to estimate the amount of external torque that is being applied to the AFS system 110. At step 212, for example, while the AFS system 110 is in the locked state, a motor angle sensor 113 may measure the rotational displacement of the AFS motor 114, such as, for example, by sensing a rotation angle of the AFS motor, and relay the measured angle to the adaptive steering controller 116. And, at step 214, the adaptive steering controller 116 may then calculate a deformation (e.g., compression) of the bushing 156 based on the measured rotation angle. In accordance with various embodiments, for example, the adaptive steering controller 116 may calculate the deformation of the bushing 156 by subtracting a center position of the pocket 159 (i.e., of the locking disk 160) from the measured rotation angle of the AFS motor 114. In other words, when the AFS system 110 is in the locked state, rotation of the locking disk 160 (i.e., the amount of rotation that the locking disc 160 experiences) can be measured with reference to a position with zero applied torque. Since the center of the pocket 159 represents a region with zero torque, the rotation of the locking disk 160 can be measured with reference to the center of the pocket 159. Those of ordinary skill in the art would understand, however, that the controller 116 may calculate the deformation of the bushing 156 using various sensor inputs and/or using various known methods and/or techniques.

At step 216, the adaptive steering controller 116 may then estimate an amount of external torque in the AFS system based on the calculated deformation of the bushing 156. In accordance with various embodiments, for example, the adaptive steering controller 116 may be preprogrammed with a lookup table and/or data from a theoretical model of the AFS system (i.e., which simulated deformation during various applied external torques), which correlates a given deformation with an applied external torque. For example, the preprogrammed correlation information may be stored in a memory associated with the adaptive steering controller 116. And, the adaptive steering controller 116 may use the correlation information to transform the calculated deformation of the bushing 156 into an estimated external torque.

At step 218, the adaptive steering controller 116 may then compare the estimated external torque with a threshold torque to determine whether or not the sensed high torque event is over. In various embodiments, for example, the threshold torque may be correlated with a torque indicative of a high torque event. Thus, if the estimated torque is less than the threshold torque, the controller 116 may determine that the high torque event is over and, at step 220, transition the AFS system 110 from the locked state back to the unlocked state, via the locking mechanism 150. For example, the adaptive steering controller 116 may transition the AFS system 110 from the locked state to the unlocked state by once again activating the locking pin 158, via the solenoid 152, to disengage the pocket 159 of the locking disk 160, thereby allowing the locking disk 160 and in turn the motor 114 to freely rotate.

If, however, the estimated torque is greater than or equal to the threshold torque, the adaptive steering controller 116 may determine that the high torque event is not over and keep the AFS system in the locked state, while running through the method again to re-estimate the external torque. In this manner, while the AFS system 110 is in the locked state due to a high torque event, the controller 116 may continuously estimate the external toque being applied to the system 110 to determine when the system 110 can be unlocked (i.e., when the high torque event is over).

As would be understood by those of ordinary skill, however, the method 200 and the system 100 to which it relates, which are illustrated and described with reference to FIGS. 1-5, are exemplary only. And, those of ordinary skill in the art would understand how to implement the disclosed systems and methods into various other vehicle systems based on the present disclosure. For example, the disclosed system 100 and method 200 may be implemented to estimate the torque in any locked vehicle system, by calculating a deformation of a stiff material within the system's locking mechanism. Various additional embodiments of the present disclosure, for example, contemplate estimating an amount of external torque in a locked active suspension system. In such embodiments, a motor angle sensor may be used to measure a rotation angle of an actuator in the active suspension system, and the rotation angle may be used by a controller to calculate a deformation of a rubber bushing within the suspension system's locking mechanism.

Furthermore, the methods described above can be performed in one or more devices of the vehicle. For example, the methods can be performed by a control device of an adaptive steering system (e.g., an AFS system) such as a central control unit or controller 116. The control device can be implemented within any element of the AFS system such as a control unit. Alternatively, the control device can be a separate device from any of the above-described AFS system elements. The control device can include a storage element such as a disk drive, flash drive, memory circuit, or other memory device. The storage element can store software which can be used in operation of the control device. Software can include computer programs, firmware, or some other form of machine-readable instructions, including an operating system, utilities, drivers, network interfaces, applications, and the like. The control device can further include a processing element such as a microprocessor or other circuitry to retrieve and execute software from the storage element. The control device can also comprise other components such as a power management unit, a control interface unit, etc.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices.

While the present disclosure has been disclosed in terms of exemplary embodiments in order to facilitate better understanding of the present disclosure, it should be appreciated that the present disclosure can be embodied in various ways without departing from the principle of the disclosure. Accordingly, while the present disclosure has been disclosed in terms of using an AFS system with a single controller, the disclosure as disclosed works equally well for various quantities and types of controllers and/or microprocessors. Therefore, the present disclosure should be understood to include all possible embodiments which can be embodied without departing from the principle of the disclosure set out in the appended claims.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

Further modifications and alternative embodiments will be apparent to those of ordinary skill in the art in view of the disclosure herein. For example, the systems and the methods may include additional components or steps that were omitted from the diagrams and description for clarity of operation. Accordingly, this description is to be construed as illustrative only and is for the purpose of teaching those skilled in the art the general manner of carrying out the present disclosure. It is to be understood that the various embodiments shown and described herein are to be taken as exemplary. Elements and materials, and arrangements of those elements and materials, may be substituted for those illustrated and described herein, parts and processes may be reversed, and certain features of the present disclosure may be utilized independently, all as would be apparent to one skilled in the art after having the benefit of the description herein. Changes may be made in the elements described herein without departing from the spirit and scope of the present disclosure and following claims.

This description and the accompanying drawing that illustrates exemplary embodiments of the present teachings should not be taken as limiting. Various mechanical, compositional, structural, electrical, and operational changes may be made without departing from the scope of this description and the claims, including equivalents. In some instances, well-known structures and techniques have not been shown or described in detail so as not to obscure the disclosure. Like numbers in two or more figures represent the same or similar elements. Furthermore, elements and their associated features that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

What is claimed is:

1. A system for estimating torque in a vehicle system, comprising:
   a locking mechanism configured to transition the vehicle system between an unlocked state and a locked state, the locking mechanism comprising a component formed of a stiff material; and
   a controller configured to estimate an amount of torque in the vehicle system, while the vehicle system is in the locked state, based on a deformation of the stiff material.

2. The system of claim 1, wherein the locking mechanism comprises a solenoid surrounded by a rubber material.

3. The system of claim 2, wherein the locking mechanism further comprises a locking pin, the solenoid being configured to activate the locking pin to transition the vehicle system between the unlocked state and the locked state.

4. The system of claim 3, wherein, when activated to transition the vehicle system between the unlocked state and the locked state, the locking pin is configured to engage a locking disk that is coupled to a shaft of a motor within the vehicle system.

5. The system of claim 1, wherein the locking mechanism comprises a solenoid surrounded by a bushing.

6. The system of claim 1, further comprising a sensor configured to measure a displacement within the vehicle system, while the vehicle system is in the locked state, wherein the sensor is communicatively coupled to the controller, and wherein the controller is configured to calculate the deformation of the stiff material based at least in part on the displacement.

7. The system of claim 6, wherein the sensor is a motor angle sensor configured to measure a rotation angle of a motor within the vehicle system.

8. The system of claim 7, wherein the vehicle system is an adaptive front steering system, and wherein the motor angle sensor is configured to measure a rotation angle of an adaptive front steering system motor.

9. The system of claim 7, wherein the system is an active suspension system, and wherein the motor angle sensor is configured to measure a rotation angle of an actuator in the active suspension system.

10. The system of claim 8, wherein the controller is configured to calculate the deformation of the stiff material based on a rotational displacement and estimate an amount of torque in the adaptive steering system, while the adaptive steering system is in the locked state, based on the deformation.

11. The system of claim 1, wherein the controller is configured to compare the torque estimated by the controller with a threshold torque and send a request to the locking mechanism to transition the vehicle system between the locked state and the unlocked state if the torque estimated by the controller is less than the threshold torque.

* * * * *